United States Patent [19]

Bagaglia et al.

[11] Patent Number: 4,546,482
[45] Date of Patent: Oct. 8, 1985

[54] SEALED $CO_2$ LASER

[75] Inventors: Adriano Bagaglia; Renato Marchetti; Eugenio Penco, all of Rome, Italy

[73] Assignee: Selenia Industrie Eletroniche Associate, S.p.A., Rome, Italy

[21] Appl. No.: 504,133

[22] Filed: Jun. 15, 1983

[30] Foreign Application Priority Data

Jun. 15, 1982 [IT] Italy .............................. 48641 A/82

[51] Int. Cl.[4] ............................................ H01S 3/097
[52] U.S. Cl. ...................................... 372/86; 372/87; 372/61; 372/85
[58] Field of Search ...................... 372/86, 87, 61, 55, 372/85, 83

[56] References Cited

U.S. PATENT DOCUMENTS 4,292,600  9/1981  Neracher .............................. 372/87
4,367,553  1/1983  Neracher .............................. 372/83

OTHER PUBLICATIONS

Page 75D of Proceedings of 1979 Conference on Laser Engineering and Applications.
Pages 511–516 and 524–529 of Proceedings of 1979 International Conference on Lasers.
Pages 106–115 of treatise by G. J. Ernst PhD (1977)—University of Technology of Enschede, Netherlands.

Primary Examiner—William L. Sikes
Assistant Examiner—Léon Scott, Jr.
Attorney, Agent, or Firm—Karl F. Ross; Herbert Dubno

[57] ABSTRACT

A $CO_2$ laser has a cylindrical housing of vitreous or ceramic material enclosing two confronting main electrodes which are connected across a trigger circuit, one of these electrodes being in conductive contact with a metallic layer surrounding substantially the entire outer surface of the housing to serve as an excitation electrode generating a corona discharge inside the housing. The gas in the housing is under substantially atmospheric pressure.

5 Claims, 2 Drawing Figures

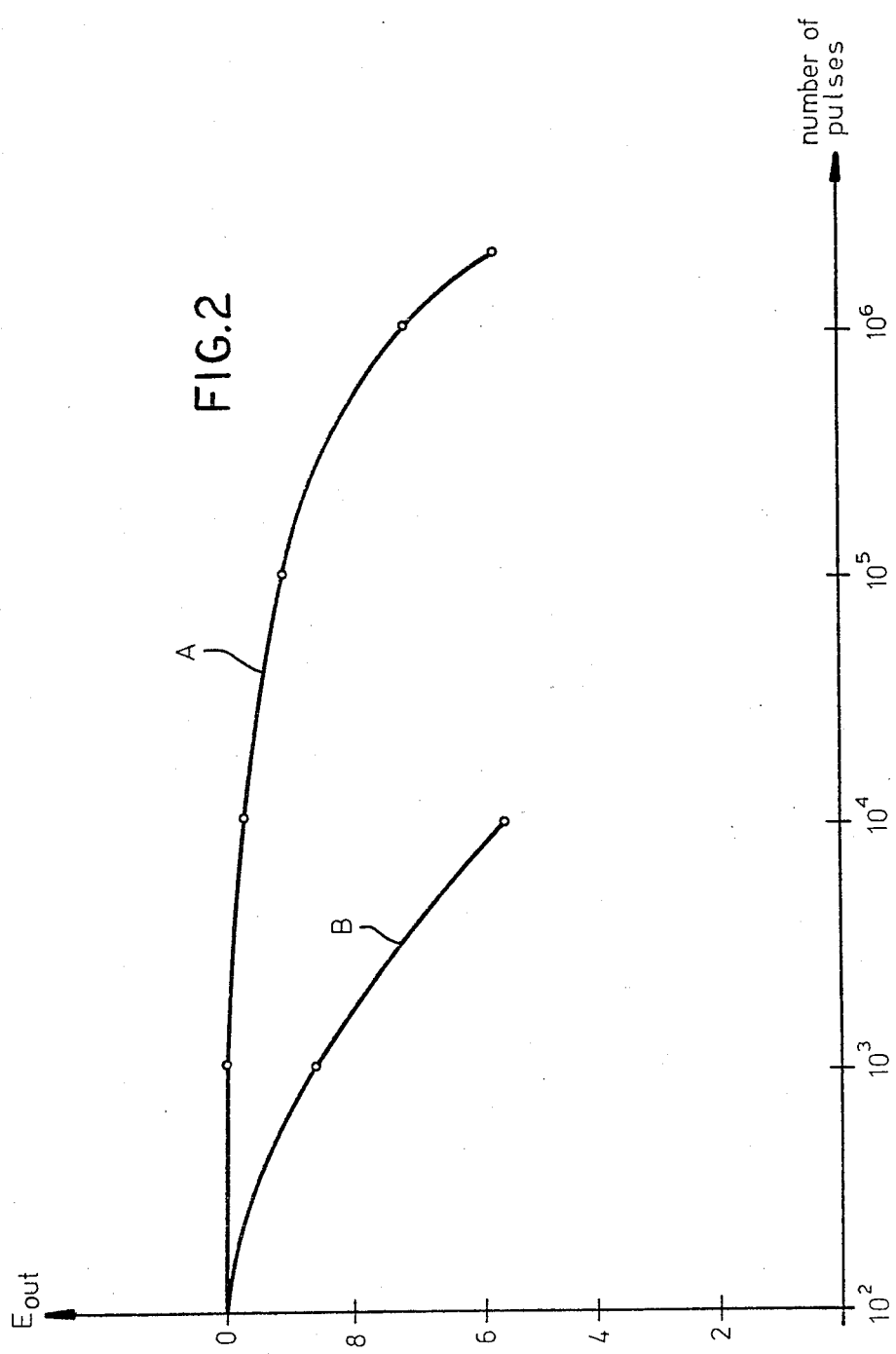

SEALED CO₂ LASER

FIELD OF THE INVENTION

Our present invention relates to a laser of the type comprising a pair of externally triggerable electrodes confronting each other within a gaseous medium—specifically one containing a significant proportion of $CO_2$—in a sealed housing, the medium being preferably under substantially atmospheric pressure.

BACKGROUND OF THE INVENTION

Lasers of this description, known in the art under the designation TEA, have the inherent drawback that the discharge becomes unstable with internal pressures exceeding a few torrs, owing to the transformation of the glow into a localized arc interfering with the pumping action of the trigger circuit. Various attempts have been made to solve this problem, these solutions generally involving the pre-ionization of the gaseous laser atmosphere by ultraviolet radiation. Such radiation may be periodically emitted by an ancillary source, activated between pulses applied to the laser electrodes, yet this technique tends to give rise in a sealed laser to a progressively increasing oxygen content reducing its service life; see, for example, an article by B. Norris and A.L.S. Smith titled "Sealed Mini-TEA CO₂ Laser" published on page 75D of the Proceedings of the 1979 Conference on Laser Engineering and Applications. Also known is the Lamberton-Pearson method which utilizes a corona-type discharge between an ancillary wire electrode and one of the main laser electrodes closely adjoining same. The wire may be incorporated in a dielectric board, e.g. as described in two articles by H.M. von Bergmann, V. Hasson and D.J. Brink on pages 511–516 and 524–529 of the Proceedings of the 1979 International Conference on Lasers. The presence of such a board, however, may cause some contamination by organic substances. A modification of that method, described and shown in U.S. Pat. Nos. 4,292,600 and 4,367,553, employs a pointed ancillary electrode in lieu of a wire.

The Lamberton-Pearson method and its variations avoid the need for a separate UV source but, aside from structural complexity, have the disadvantage of unsymmetrical ionization which unfavorably affects the resulting laser beam. This disadvantage is avoided in a structure described on pages 106–115 of a treatise by G.J. Ernst, PhD, published 1977 by the University of Technology of Enschede, Netherlands. The latter structure comprises a strip line of the Blumlein type with a pair of copper plates separated by a layer of Mylar. One copper plate, which is grounded, externally adjoins one of two glass sidewalls of a prismatic housing bounding the laser cavity while the other is energized to set up an oscillatory field across the electrodes which causes a corona discharge passing from one electrode to the other along the mutually parallel housing walls separating same. The UV radiation caused by this discharge ionizes the gas in the cavity.

OBJECT OF THE INVENTION

The object of our present invention is to provide an improved laser of the type referred to, e.g. for use in medium distance telemetry, which obviates the drawbacks of the prior systems discussed above.

SUMMARY OF THE INVENTION

In accordance with our present invention, the dielectric laser housing is cylindrical and is provided with an ancillary electrode covering substantially its entire outer surface. This ancillary electrode is in conductive contact with one of the two main electrodes extending axially within the housing whereby, in operation, an electric field is set up between that ancillary electrode and the other main electrode (which may be grounded). This field, we have found, results in a substantially uniform corona discharge over a major part of the inner housing surface.

The corona discharge thus generated illuminates both main electrodes so as to give rise to a high-quality beam.

BRIEF DESCRIPTION OF THE DRAWING

The above and other features of our invention will now be described in detail with reference to the accompanying drawing in which:

FIG. 2 is a graph relating to the operation of the laser of FIG. 1.

SPECIFIC DESCRIPTION

Figure 1:
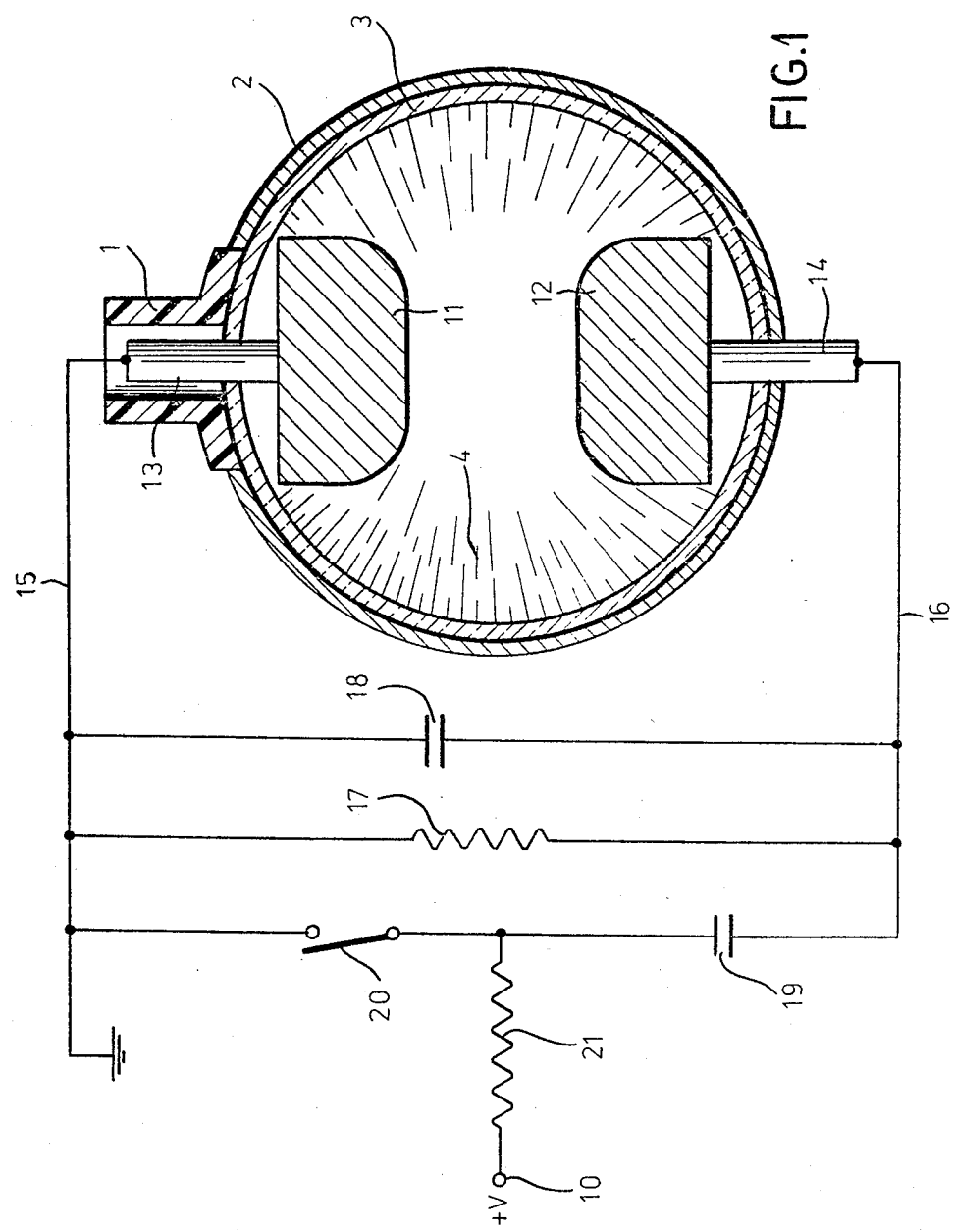
FIG. 1 is a cross-sectional view of a TEA CO₂ laser embodying our invention.

The laser shown in FIG. 1 comprises a cylindrical housing 3 of dielectric material which may be of vitreous and/or ceramic character, e.g. glass, alumina or a composite known under the mark Cer-Vit. Housing 3 is externally covered by a metallic coating 2 which serves as an ancillary pre-ionizing electrode and overlies the entire outer surface thereof, except at locations where nonconductive nipples 1 (only one shown) spacedly surround respective metallic stems 13 that are integral with and support an elongate main electrode 11 extending axially within the housing. A similar electrode 12 confronting electrode 11, is integral with metallic stems 14 which are in conductive contact with ancillary electrode 2. The two main electrodes 11 and 12 have symmetrical profiles and closely approach the housing 3.

A gaseous medium contained in housing 3 may have a composition similar to that described in the above identified Ernst article, e.g. a mixture of $CO_2$, $N_2$ and He in a ratio of 1:1:30. While this mixture is preferably maintained at atmospheric pressure inside the sealed housing, the walls of that housing ought to be strong enough to support a vacuum in its interior. Its nonillustrated end walls carry the usual fully and partly reflecting mirrors needed for the excitation of a laser beam and its emission from the cavity defined by electrodes 11, 12 as is well known in the art.

Electrode 11 is shown grounded by a lead 15 while electrode 12 is connected through one or more of its supporting stems 14 to a lead 16 separated from ground by a large resistor 17 in parallel with a condenser 18. Another condenser 19 couples the lead 16, through a charging resistor 21, to a terminal 10 of a voltage source +V; capacitor 19 can be periodically grounded by a trigger switch, represented schematically at 20, which may be constituted by a spark gap in conformity with conventional practice. Thus, the two series-connected condensers 18 and 19 constitute a capacitive voltage divider for the pulsing of the ungrounded laser electrode 12.

When capacitor 18 is charged in the open-circuited state of trigger switch 20, a corona discharge 4 comes into existence along major parts of the inner wall surface of housing 4, virtually over the entire area lying between the proximal edges of electrodes 11 and 12.

The graph of FIG. 2 illustrates the output energy $E_{out}$, in absolute units, of a sealed laser according to our invention (curve A) and of a comparable laser ionized by externally generated UV radiation (curve B) for a number of luminous pulses generated thereby, this energy dropping to 60% of its original value after more than $10^6$ pulses in the case of curve A while such a drop occurs already after $10^4$ pulses in the case of curve B. A peak power of 300 kW can be achieved. We have also found that not a single laser pulse is lost in a sequence of $1.2 \times 10^5$ such pulses.

The configurations and dimensions of electrodes 11 and 12 may substantially correspond to those of the Ernst article; this also applies to the cross-sectional area of the housing and to its wall thickness.

Thus, our invention provides a laser which satisfies the aforestated desiderata, has a compact trigger circuit requiring no distributed capacitances, is of simple geometrical structure and can be manufactured and assembled at low cost.

We claim:

1. A laser comprising a sealed cylindrical housing of dielectric material forming a laser-resonant cavity, delimitized by a partially transmissive mirror and a fully reflective mirror a pair of confronting main electrodes extending axially within said housing, a $CO_2$-active gaseous medium in said housing capable of excitation by said electrodes to produce laser emissions, a trigger circuit connected across said main electrodes for periodically pulsing said main electrodes to produce a laser output by ionization of said medium and an ancillary external electrode covering substantially the entire outer surface of said housing in conductive contact with one of said main electrodes for generating a pre-ionizing corona discharge in said gaseous medium.

2. A laser as defined in claim 1 wherein said gaseous medium is under substantially atmospheric pressure.

3. A laser as defined in claim 1 wherein the other of said main electrodes is grounded.

4. A laser as defined in claim 3 wherein said other of said electrodes is provided with conductive supporting means penetrating said housing, said supporting means being surrounded by at least one nonconductive sleeve insulating said supporting means from said ancillary electrode.

5. A laser as defined in claim 4 wherein said sleeve spacedly encircles said supporting means.

* * * * *